(12) United States Patent
Khan et al.

(10) Patent No.: US 11,549,359 B2
(45) Date of Patent: Jan. 10, 2023

(54) SYSTEMS AND METHODS TO IDENTIFY AND QUANTIFY FIELD DEVELOPMENT OPPORTUNITIES THROUGH INTEGRATION OF SURFACE AND SUB-SURFACE DATA

(71) Applicant: Saudi Arabian Oil Company, Dhahran (SA)

(72) Inventors: Waqas Ahmed Khan, Khobar (SA); Nauman Aqeel, Dhahran (SA); Ali M. Al-Shahri, Doha (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/073,802

(22) Filed: Oct. 19, 2020

(65) Prior Publication Data
US 2021/0348498 A1     Nov. 11, 2021

Related U.S. Application Data

(60) Provisional application No. 63/022,899, filed on May 11, 2020.

(51) Int. Cl.
*E21B 47/003*     (2012.01)
*G06T 17/00*       (2006.01)
*E21B 47/12*       (2012.01)

(52) U.S. Cl.
CPC ............ *E21B 47/003* (2020.05); *E21B 47/12* (2013.01); *G06T 17/00* (2013.01)

(58) Field of Classification Search
CPC ........ E21B 49/00; E21B 49/02; E21B 47/003; E21B 47/12; G06T 17/00
See application file for complete search history.

(56) References Cited

U.S. PATENT DOCUMENTS

| | | | |
|---|---|---|---|
| 6,980,940 B1 * | 12/2005 | Gurpinar | E21B 43/00 166/250.16 |
| 8,412,501 B2 | 4/2013 | Oury et al. | |

(Continued)

FOREIGN PATENT DOCUMENTS

| | | |
|---|---|---|
| CN | 103605161 A | 2/2014 |
| CN | 108765562 A | 11/2018 |

(Continued)

OTHER PUBLICATIONS

Haler "Fault surface and fault throws from 3D seismic images" (Year: 2012).*

(Continued)

*Primary Examiner* — Catherine T. Rastovski
*Assistant Examiner* — Kaleria Knox
(74) *Attorney, Agent, or Firm* — Dinsmore & Shohl LLP (57) ABSTRACT

Systems and methods that calculate and display reservoir properties are disclosed. In one embodiment, a method of displaying field development opportunities includes receiving production data including production attributes for a plurality of wells, receiving three-dimensional model data including model attributes from one or more fields, cross-linking the production data and the three-dimensional model data, and displaying a graphical user interface. The graphical user interface includes a two-dimensional view of a selected field and a plurality of graphs, each graph of the plurality of graphs including a plurality of bins. Each graph of the plurality of graphs corresponds to a reservoir property. Each bin of the plurality of bins corresponds to a range of values along one of the first axis and the second axis. The plurality of graphs are arranged within the graphical user interface such that the plurality of bins are aligned with one another.

18 Claims, 6 Drawing Sheets

(56) References Cited

U.S. PATENT DOCUMENTS

| | | | |
|---|---|---|---|
| 9,988,901 B2 | 6/2018 | Rowe | |
| 10,452,753 B2* | 10/2019 | Gunturu | G06T 11/206 |
| 10,577,895 B2 | 3/2020 | Berezin et al. | |
| 2016/0061020 A1* | 3/2016 | Sayarpour | G01N 27/22 |
| | | | 702/6 |
| 2016/0170088 A1* | 6/2016 | Grader | G01N 33/24 |
| | | | 703/6 |
| 2017/0123097 A1* | 5/2017 | Fang | G01V 3/38 |
| 2017/0371211 A1* | 12/2017 | Zeng | G02F 1/1341 |
| 2018/0038204 A1* | 2/2018 | Khan | E21B 7/04 |
| 2019/0057168 A1* | 2/2019 | Holland | E21B 49/02 |

FOREIGN PATENT DOCUMENTS

| | | | | |
|---|---|---|---|---|
| CN | 111812731 A * | 10/2020 | | G01V 3/38 |
| WO | 2013148442 A1 | 10/2013 | | |
| WO | 2016187048 A1 | 11/2016 | | |
| WO | WO-2016187048 A1 * | 11/2016 | | E21B 49/00 |

OTHER PUBLICATIONS

Oliver et.al., "Advanced cuttings analysis provides improved completion design, efficiency and well production" (Year: 2016).*

International Search Report and Written Opinion dated Aug. 24, 2021 pertaining to International application No. PCT/US2021/031056 filed May 6, 2021, 14 pages.

Amarile—Enjoy Petroleum Engineering: "RE-Studio—Generating Hydrocarbon-Pore-Volume-Map", YouTube Video, Aug. 20, 2019, XP055826014, Retrieved from the Internet: URL:https://www.youtube.com/watch?v=EUSqBZw5J7g [retrieved on Jul. 20, 2021] the whole document.

* cited by examiner

SYSTEMS AND METHODS TO IDENTIFY AND QUANTIFY FIELD DEVELOPMENT OPPORTUNITIES THROUGH INTEGRATION OF SURFACE AND SUB-SURFACE DATA

CROSS-REFERENCE TO RELATED APPLICATIONS

This application claims the benefit of priority under 35 U.S.C. § 119 to U.S. Provisional Application No. 63/022,899, filed on May 11, 2020 and entitled "Systems and Methods to Identify and Quantify Field Development Opportunities Through Integration of Surface and Subsurface Data," the contents of which are hereby incorporated by reference in its entirety.

BACKGROUND

Oil and gas companies may annually update a business plan that is used for budgeting forecasts and resources allocation. This process may involve identifying areas of development where future wells will be drilled. Three-dimensional models of oil and/or gas fields may be used to calculate hydrocarbon volumes to identify prospective areas for development. However, quantifying hydrocarbon volumes through three-dimensional models is a challenging and cumbersome process. Conventionally, a user needs to pre-define areas, rules and logics to perform a single volume calculation. This process needs to be repeated if volume calculations are needed for a different area or logics.

SUMMARY

Embodiments of the present disclosure are directed to systems and methods that calculate and display reservoir properties that are calculated from three-dimensional model data and production data so that a user may easily visualize areas of opportunity for field development. The three-dimensional model data and the production data are linked based on common location coordinates, and various reservoir properties are calculated for a plurality of locations. Reservoir properties are plotted in a side-by-side arrangement so that the user may compare multiple reservoir properties at binned locations to identify areas of opportunity. Embodiments further enable the on-the-fly calculation of hydrocarbon volumes in selected zones and/or layers.

In one embodiment, a method of displaying field development opportunities includes receiving, from one or more databases, production data including production attributes for a plurality of wells, receiving, from the one or more databases, three-dimensional model data including model attributes from one or more fields, cross-linking the production data and the three-dimensional model data, and displaying, in an electronic display, a graphical user interface. The graphical user interface includes a two-dimensional view of a selected field of the one or more fields, wherein the two-dimensional view provides a first axis and a second axis, and a plurality of graphs, each graph of the plurality of graphs including a plurality of bins. Each graph of the plurality of graphs corresponds to a reservoir property. Each bin of the plurality of bins corresponds to a range of values along one of the first axis and the second axis. The plurality of graphs are arranged within the graphical user interface such that the plurality of bins are aligned with one another.

In another embodiment, a system for displaying field development opportunities includes one or more processors, an electronic display, and a non-transitory computer-readable memory storing instructions. When executed by the one or more processors, the instructions cause the one or more processors to receive, from one or more databases, production data including production attributes for a plurality of wells, receive, from the one or more databases, three-dimensional model data including model attributes from one or more fields, cross-link the production data and the three-dimensional model data, and display, in the electronic display, a graphical user interface. The graphical user interface includes a two-dimensional view of a selected field of the one or more fields, wherein the two-dimensional view provides a first axis and a second axis, and a plurality of graphs, each graph of the plurality of graphs including a plurality of bins. Each graph of the plurality of graphs corresponds to a reservoir property. Each bin of the plurality of bins corresponds to a range of values along one of the first axis and the second axis. The plurality of graphs are arranged within the graphical user interface such that the plurality of bins are aligned with one another.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE DISCLOSURE

Embodiments of the present disclosure are directed to systems and methods that calculate and display reservoir properties that are calculated from three-dimensional and production data so that a user may easily visualize areas of opportunity for field development.

More particularly, embodiments link surface production data and sub-surface three-dimensional hydrocarbon volume by binning data based on location coordinates. The user may decide on the resolution of these bins and, once the regions are binned, the three-dimensional hydrocarbon volume and the surface production data is split along these bins side by side, thereby providing direct comparison of three-dimensional volumes and production trends per region. This helps in identifying development area where there are significant hydrocarbon volumes yet to be swept, i.e. areas with high remaining hydrocarbon volume and less production in history.

Once an aerial development area of interest is identified, the embodiments provide drill-down analysis by calculating hydrocarbon volumes by vertical zones and layers. All of these volume calculations are performed interactively and on the fly, just by selecting the layers or zones in a graphical user interface, corresponding volumes in these layers is calculated. If volume calculation needs to be repeated for a different set of layers or regions the user simply selects layers or filters from the respective windows and the calculations are updated.

Various embodiments of systems and methods that calculate and display reservoir properties are described in detail below.

Figure 1:
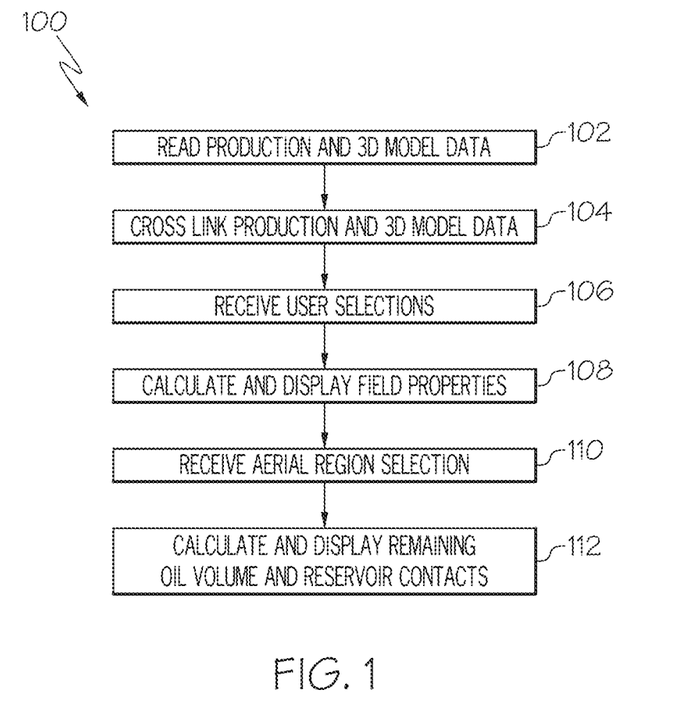
FIG. 1 illustrates an example method of calculating and displaying reservoir properties according to one or more embodiments described and illustrated herein.

Referring now to FIG. 1, a non-limiting example method of displaying information relating to oil and/or gas field development is illustrated by flowchart 100. It should be understood that embodiments are not limited by the number or arrangement of steps shown by FIG. 1. At block 102, production data and three-dimensional model data are read from one or more databases. The production data and the three-dimensional model data may be stored in the same database, or in separate databases. Embodiments are not limited by the type of production data and the three-dimensional model data.

The production data includes production attributes relating to the production of hydrocarbons for a plurality of wells, and may include the entire well history from the date of initial production to the current date. The production data may be continuously updated. Non-limiting example production attributes include:
  Field Name
  Reservoir Name
  Well Name and Number
  Unique Well Identifier (UWI)
  Date
  Flowing Well Head Pressure
  Well Operating Days
  Monthly Oil Volume Produced
  Monthly Water Volume Produced
  Monthly Gas Volume Produced
  Average Oil Rate
  Average Water Rate
  Average Gas Rate
  Average Water Cut
  Static Bottom Hole Pressure (SBHP).

Figure 2:
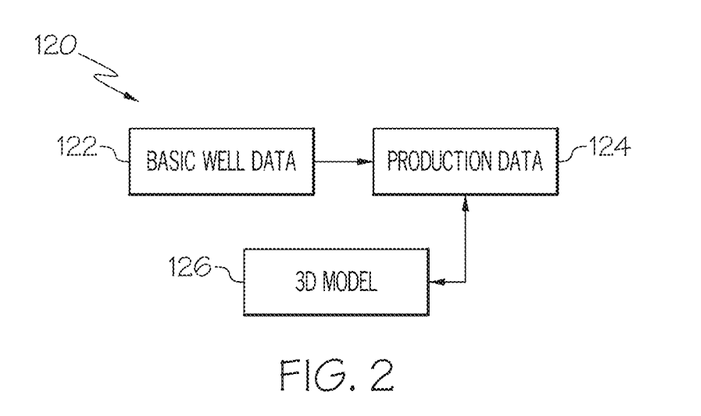
FIG. 2 illustrates any example method of cross-linking production data and three-dimensional model data according to one or more embodiments described and illustrated herein.

Referring to FIG. 2, well data 122 including well attributes is also included in the production data 124. Well attributes include basic information about the plurality of wells. Well attributes of the well data may include, but is not limited to, the following:
  Unique Well Identifier (UWI)
  UTMX coordinate
  UTMY coordinate.

The UTMX and UTMY coordinates provide the location coordinates for the plurality of wells. The unique well identifier may be an identification number used to reference wells. As described in more detail below, the location coordinates may be used to link the production data to the three-dimensional model data. In some embodiments, the well data and the production data are provided in tables. The table(s) of the well data and the table(s) of the production data are merged (e.g., using the unique well identifier).

Still referring to FIG. 2, the three-dimensional model data provides information with respect to the geological features of one or more fields of interest, and may include model attributes such as, without limitation:
  Porosity
  Permeability
  Water Saturation (one property for each unique Date in Production Table)
  Zones
  Cell Volume
  I index
  J index
  K index
  Cell UTMX coordinate
  Cell UTMY coordinate
  Reservoir Contact Index.

Referring to FIGS. 1 and 2, the production data 124 (which includes the well data 122) is cross-linked with the three-dimensional model data 126. The production data 124 and the three-dimensional data 126 may also be linked by date such that a user may select a date range to display the relevant data, as described in more detail below. In embodiments the production data 124 and the three-dimensional model data 126 are not merged but rather linked by the location coordinates (UTMX and UTMY). However, the production data 124 and the three-dimensional model data 126 may be merged into a dedicated data structure in other embodiments. The linked production data 124 and the three-dimensional model data 126 enables insightful information to be displayed to the user in a graphical user interface so that the user may make informed decisions regarding oil and/or gas field development.

Figure 3:
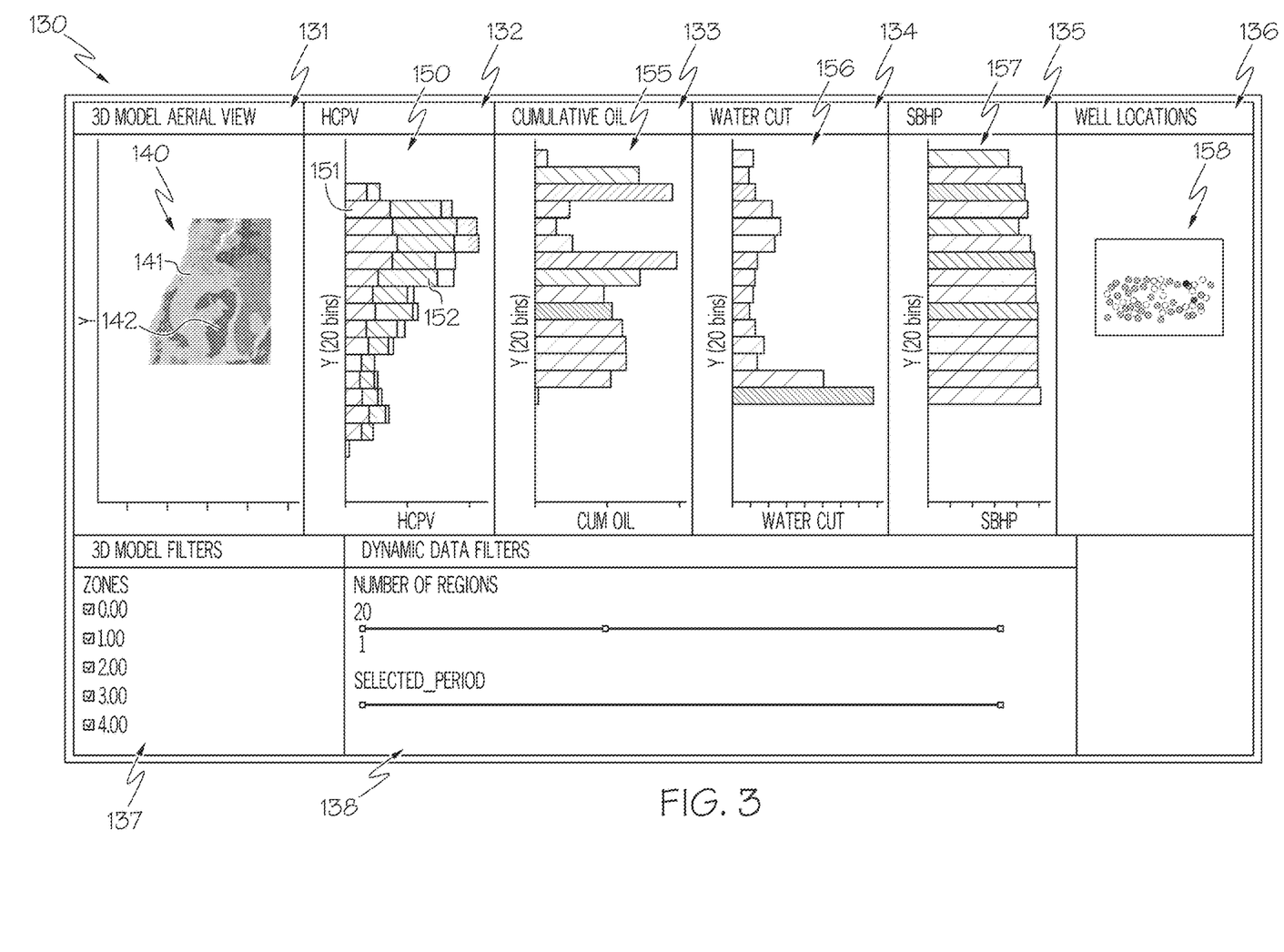
FIG. 3 illustrates an example graphical user interface for calculating and displaying reservoir properties according to one or more embodiments described and illustrated herein.
Figure 4:
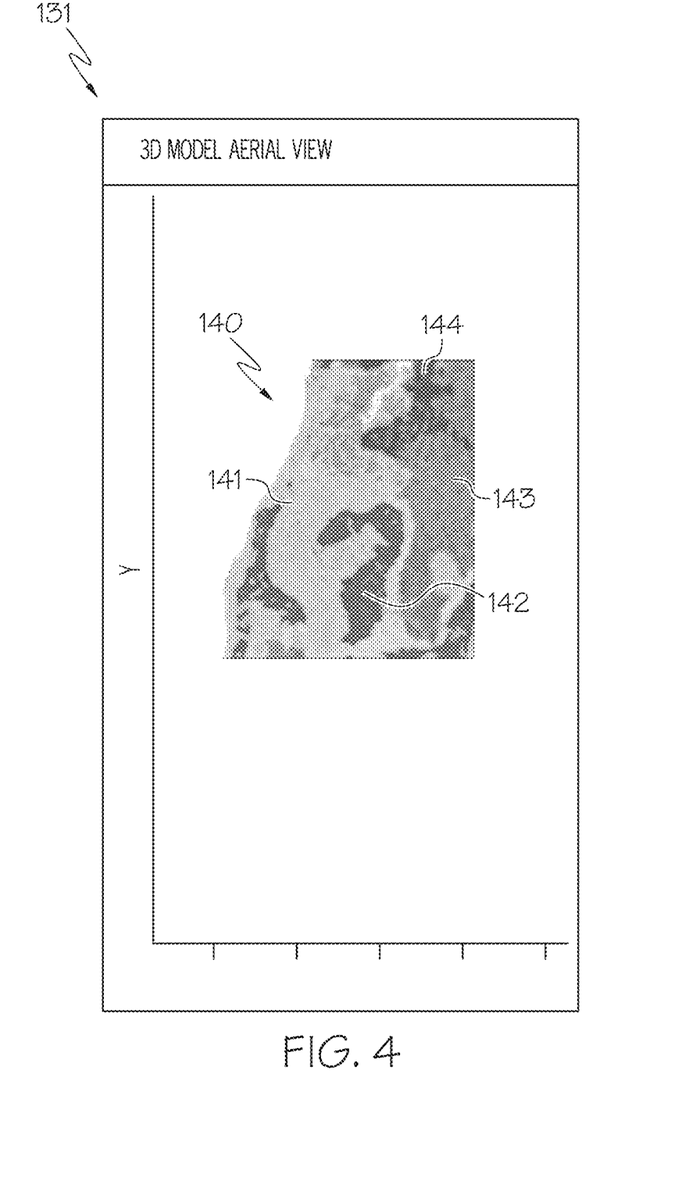
FIG. 4 is a close-up view of a three-dimensional aerial view of the graphical user interface illustrated by FIG. 3 according to one or more embodiments described and illustrated herein.

Referring now to FIG. 3, a non-limiting example graphical user interface 130 is illustrated. The graphical user interface 130 displays multiple graphs relating to reservoir properties in multiple side-by-side windows on an electronic display. The graphical user interface 130 allows a user to select various data filters to display information of interest. It should be understood that embodiments are not limited to the specific arrangement illustrated by FIG. 3, and that other data and filters may be displayed. Window 138 provides an interface for a user to select a number of bins that will be distributed across one of two axes (e.g., the Y-axis using the UTMY coordinates) of a desired field. In some embodiments, a user may select a desired field from a plurality of available fields by a drop-down menu or some other graphical element. Upon selection of the field, all the data such as production and 3D model data is pulled and displayed. The aerial view 140 is derived from the three-dimensional model data 126 discussed above. Window 138 also enables the user to select a time period (e.g., by clicking and dragging the timeline range filter with a mouse/trackpad to the time of interest) for the production data to be shown in the various windows of the graphical user interface 130 that are discussed in more detail below. FIG. 4 illustrates a close-up view of the aerial view 140 shown in FIG. 3. The aerial view 140 also includes reservoir zones that are represented by a color code. As a non-limiting example, zone 142 may be purple, and zone 141 may be yellow. The zones may be represented in any manner.

As used herein, an aerial region is a top view of a field and includes all of the three-dimensional model cells (I, J, K) with all of the K layers stacked over each other in a two-dimensional view. The vertical layers are a sub-set of aerial regions and contain only the depth (K) dimension, (i.e., all the values in I and J cells across a given layer (K)). Vertical zones are sub units of a three-dimensional reservoir as characterized by geology. In the three-dimensional model they are defined by lumping the K layers together, for example in a model with 100 layers, the first 30 layers could be lumped together as Zone 1, the next 50 layers as Zone 2 and the last 20 as Zone 3.

After selecting the number of regions (block 106 of FIG. 1), the following non-limiting reservoir properties are calculated and displayed in respective windows 131-135 at block 108 of FIG. 1:

Hydrocarbon Pore Volume (HCPV=cell volume X porosity X (1−water saturation)) across different binned UTMY locations at a selected time Cumulative Oil produced within the selected period Average Water Cut across different binned UTMY locations within the selected period Average Static Bottom Hole Pressure (SBHP) across different binned UTMY locations within the selected period.

Window 132 illustrates the HCPV across different binned UTMY locations in a HCPV graph 150. Thus, each bar of the HCPV graph 150 of FIG. 3 represents one bin defined by a range of UTMY locations. As stated above, the user may define how many bins are to be displayed by using controls in window 138. The illustrated example has 30 bins. The example HCPV graph 150 also illustrates the HCPV for each zone in each binned UTMY locations. For example, portions 151 of the bins of the HCPV graph 150 illustrate the HCPV of zone 141 in window 131 at the respective binned UTMY locations. Similarly, portions 152 of the bins of the HCPV graph 150 illustrate the HCPV of zone 141 in window 131 at the respective binned UTMY locations. The HCPV may be calculated using the three-dimensional model data. The portions of the HCPV graph 150 may have a color that matches the color of the corresponding zone in the aerial view 140 in window 131, for example.

Window 133 provides a cumulative oil graph 155 that plots the cumulative oil within the bins and the selected period of time. Similarly, window 134 provides a water cut graph 156 showing the water cut within the bins and the selected period of time, and window 135 provides a SBHP graph 157 showing the SBHP within the bins and the selected period of time. The data for the cumulative oil graph 155, the water cut graph 156, and the SBHP graph may be derived from the production data discussed above.

The example graphical user interface 130 of FIG. 3 links three-dimensional model data with production data, which enables a user to see at a glance where development opportunities are located. Thus, a field-specific strategy may be used to identify areas of development across the field. As a non-limiting example one such rule could be to develop regions with high remaining hydrocarbon volumes, low cumulative oil production, low present water cut, and pressure. The aligned bins of UTMY locations enable a user to easily identify the aerial extent of development regions.

The user may manipulate the data that is shown in windows 131-135 by selecting reservoir zones of interest in window 137, and the number of regions to bin and the time period in window 138. As shown in window 132, not all of the zones are shown in the HCPV graph 150 because not all of the zones are selected in window 137. In some embodiments, the user may select the bars representing the bins, which causes the existing well locations 158 to be displayed in window 136.

Once the user determines the aerial extent of interest for development, he or she may drill down further to quantify vertical layers for HCPV and the reservoir contacted by existing wells. For example, referring to block 110 of FIG. 1, the user may select one or more binned regions of the user interface 130 for further investigation. The system drills down by calculating a volumetric break down of a region(s) selected from the graphical user interface 130 of FIG. 3 and provides a reporting of HCPV across each vertical layer at block 112 of FIG. 1. For each of the vertical layers, the existing contact with a well is also quantified using a well index property. The well index property is achieved by summing all of the reservoir contact index values for each layer. It is noted that the reservoir contact index property is defined as 1 whenever a well intersects that layer and 0 otherwise. Layers where many wells penetrate will have a high value well index property and vice versa.

Figure 5:
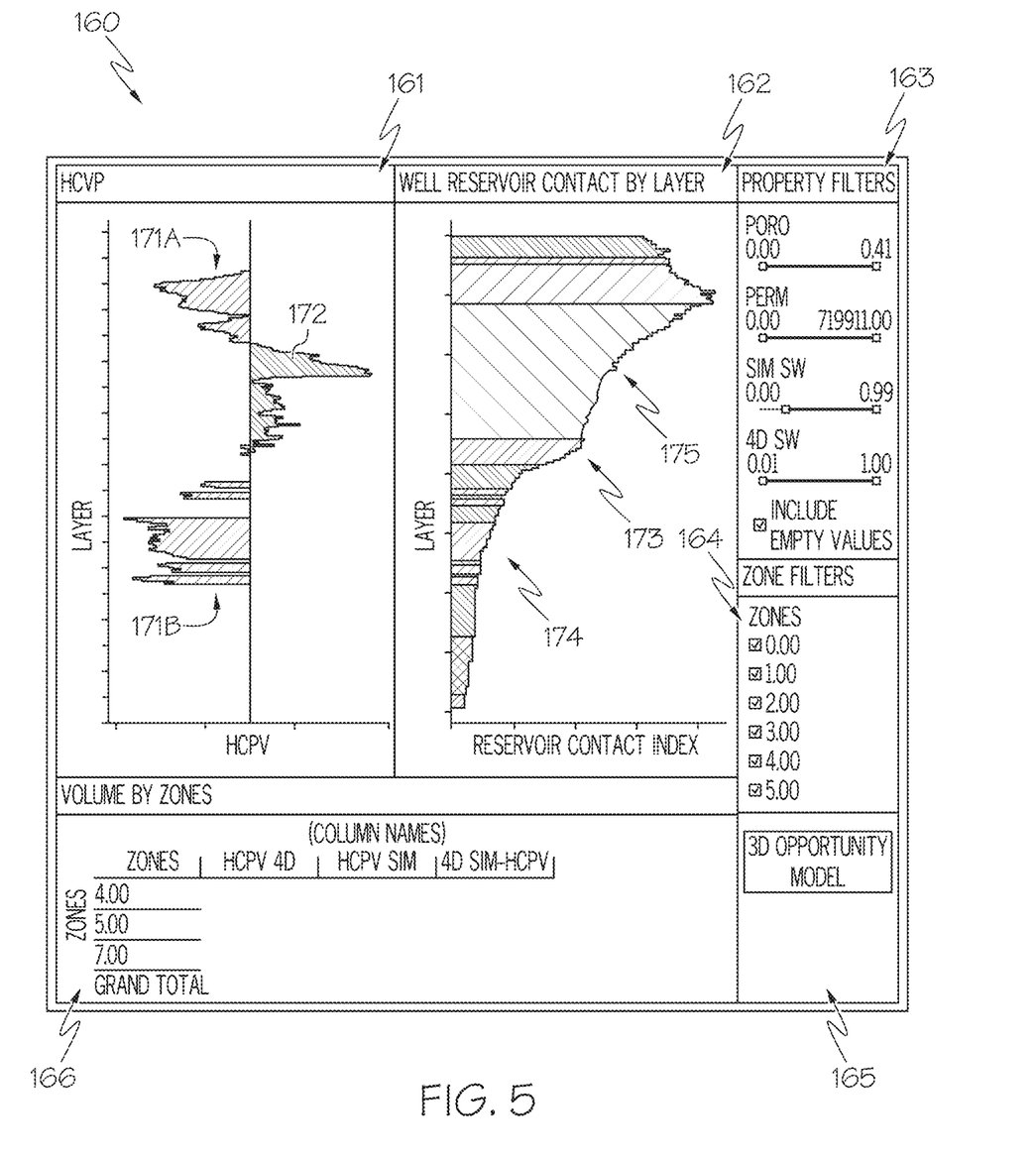
FIG. 5 illustrates another example graphical user interface displaying calculated hydrocarbon pore volume by layer of a selected region and well reservoir contact by layer of a selected region according to one or more embodiments described and illustrated herein.

The HCPV by layer and well index property are plotted in an updated graphical user interface 160 shown in FIG. 5. The graphical user interface 160 shown in FIG. 5 may be displayed upon selection of a navigational button, for example. Window 161 plots the HCPV in each layer of the selected region(s). The HCPV may be calculated from 4D surveillance model and/or from simulation. HCPV values depend on porosity, cell volume and saturation. Out of these parameters, porosity and cell volumes do not change over time but the saturation does. The reservoir simulation model can simulate the saturation changes with time starting from an initial condition and can provide an estimate of current saturation; however there are always uncertainties in this process since history matching is a non-unique solution and different model realizations can provide the same results.

The 4D surveillance model is another approach to estimate current saturation, where it does not depend on simulation but rather uses the latest saturation logs in the model to populate the saturation directly through geo-statistic property distribution algorithms. Saturation values come from one or both of the simulation models and 4D surveillance models. From each of these models the HCPV may be calculated. Cells where the HCPV values are higher in the 4D surveillance model may represent a missed opportunity from simulation saturation and vice-versa. To quantify this missed opportunity, a HCPV difference property is calculated and displayed in window 161. Layers where the aggregate of HCPV from 4D surveillance values providing higher HCPV from that of the simulation model are positive and colored in one color (e.g., red), wherein when this difference is negative it is colored in a different color (e.g., blue). So the layers shown in the first color capture any missed opportunity from the simulation model and the layers shown in the second color represent any missed opportunity from 4D surveillance model. This identification helps in making sure no oil in the reservoir is passed by. Thus, referring to FIG. 5, layers which show more opportunity from a 4D surveillance model are indicated by reference number 172 and layers that show more opportunity from simulation are indicated by reference numbers 171A and 171B.

Window 162 shows a contact graph 173 plotting reservoir well contacts by layer of the selected region. Layers with a high well reservoir contact layer have been contacted by many wells, and may not present significant development opportunities. For example, portion 175 of the example contact graph 173 shows layers that have had many well contacts, while portion 174 of the contact graph 173 shows layers that have had fewer well contacts.

The graphs of windows 161 and 162 are aligned by layer so that the user can simultaneously see the HCPV and the well reservoir contacts for each layer. In some embodiments, selection of one or more layers in one of window 161 and window 162 will cause the corresponding layer in the other of window 161 and 162 to be highlighted (e.g., lighter in color).

Using the example of FIG. 5, a user may identify the layers associated with portion 171B of the HCPV plot and portion 174 of the contact graph 173 because these layers have high HCPV and low well reservoir contact values.

Selection of the layers of interest cause corresponding volumes to be calculated for selected zones. The volumes that are calculated may be one or more of, without limitation: HCPV 4D (cell volume*porosity*(1-water saturation from 4D surveillance model)), HCPV Sim (cell volume*porosity*(1-water saturation from 4D simulation model)), and 4D Sim HCPV (HCPV 4D-HCPV Sim). The user may select which zone to be included in the volume calculation by selecting desired zones in the zone filter window 163. The example graphical user interface 160 of FIG. 5 further includes window 163, which allows a user to filter the data further by various properties, such as, without limitation, porosity, permeability, Sim SW and 4D SW (Sim SW refers to current time water saturation from simulation and 4D SW refers to current time water saturation from 4D surveillance model) to affect the calculated volumes.

These volume calculations are very efficient, fast and interactive compared to conventional approaches. In conventional approaches, volumes are reported for a predefined region and are very rigid in nature and not flexible to report volumes in different layers or region unless the regions are first defined and added as part of the input parameters. This leaves no room for performing dynamic analysis on volumes through a drill down approach, but with embodiments of the present disclosure, users are able to dynamically change the area of interest and report the corresponding HCPV volumes and opportunities in a very intuitive way by first selecting aerial region bin shown in FIG. 3. And then selecting the layers from FIG. 5, any changes to the selection are automatically and instantaneously reflected in the volume table in window 166. It is noted that the volumes are always calculated using the same formula; it is the different aggregations which results in different values. In window 166, for example, volumes across the zones within the reservoirs are aggregated. If the volume calculation needs to be repeated for a different set of layers or regions, the user simply selects them from the respective windows and the calculations are updated.

Figure 6:
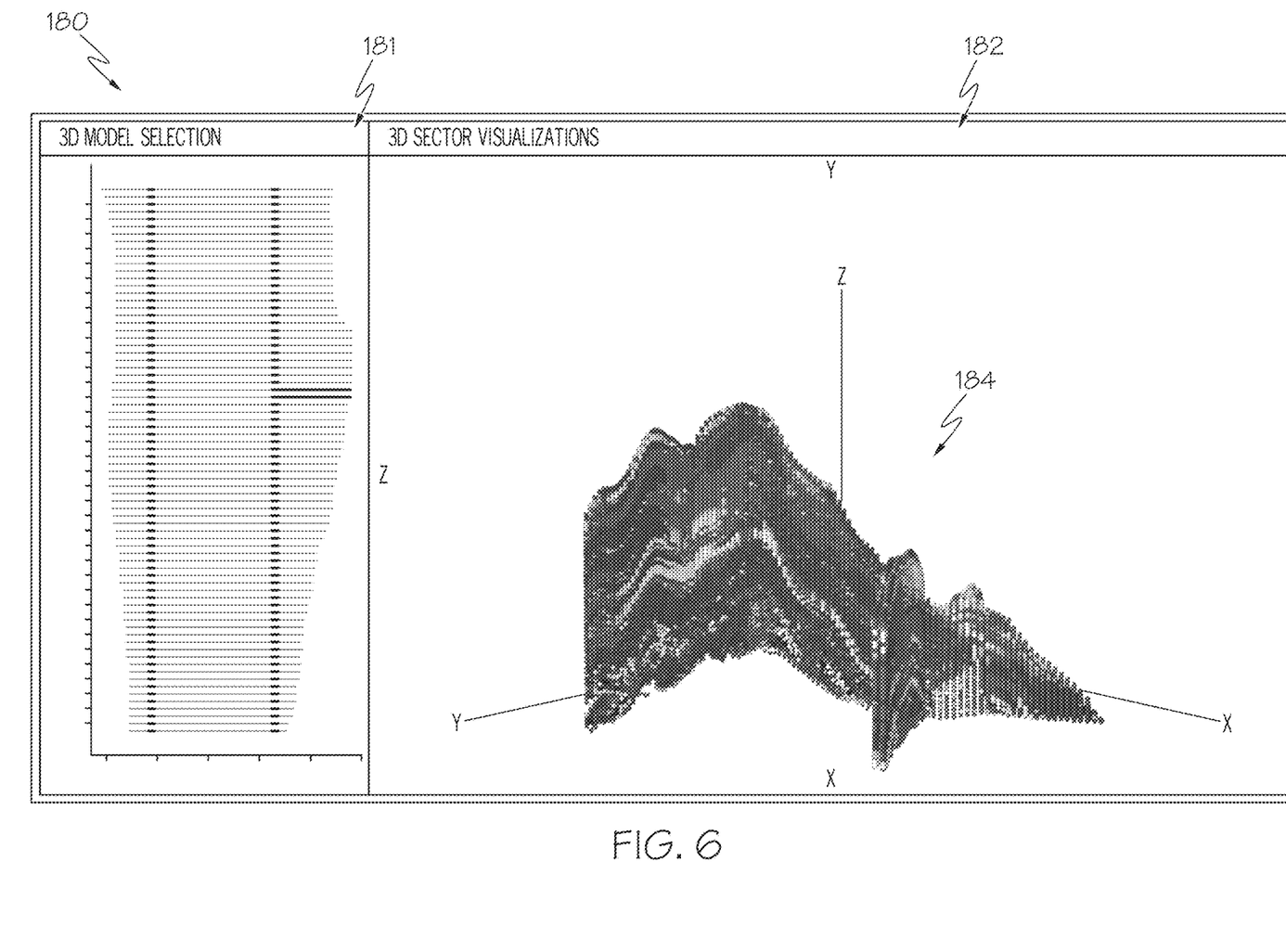
FIG. 6 illustrates another example graphical user interface displaying a three-dimensional view of a three-dimensional model of a selected region according to one or more embodiments described and illustrated herein.

The graphical user interface 160 also includes a button or a window 165 wherein, upon selection, another graphical user interface 180 is generated that includes a window 181 showing the aerial view of a selected portion of the three-dimensional model as shown in FIG. 6. The regional regions selected from the interface of FIG. 3 creates a drill down view in the interface of FIG. 5 where volumes across each layer in the selected regions from FIG. 3 are shown. On further selection of the layers from FIG. 5, the views in FIG. 6 are plotted. In window 181, the aerial view is drilled/filtered down to the region and layers selected in the previous steps. The aerial extent of this view is the same as the one shown in FIG. 3; however, it shows data for only the layers selected from the interface of FIG. 5. The user can draw or otherwise select cells in the aerial view to generate corresponding 3D cross sections 184 that are plotted in window 182. It is noted that the complete aerial extent might not be clearly visible since we are further drilling down from window 181 to get to window 182. The dark lines in window 181 are the ones we are drawing the cross sections across, but the remaining non-highlighted part of window 181 is also part of the aerial plot.

In the illustrated example, the regions of a first color (e.g., red regions) represents higher opportunities from a 4D surveillance model and the regions of a second color (e.g., blue regions) represent high opportunities from a simulation model Thus, window 182 provides a 3D model representation of the final drilled down region, wherein the red and blue colors follow the same rationale as described with respect to window 161 of FIG. 5. In addition, a third color (e.g., a white color) may represent cells where the HCPV from the 4D surveillance model and the HCPV from the simulation model both match.

The model which is being displayed may contain tens of millions of cells. Therefore, visualizing these cells altogether is almost impossible on regular computing devices, and also visualizing it provides little insight since it is difficult to make sense of the data for any user. The embodiments of the present disclosure allow users to drill down to an area of interest to ensure that it is known exactly which regions and layers are being visualized, and how much opportunities lies within the drilled down areas and layers. Additionally, the drill-down approach of embodiments of the present disclosure tremendously reduces the number of cells to visualize in 3D.

Figure 7:
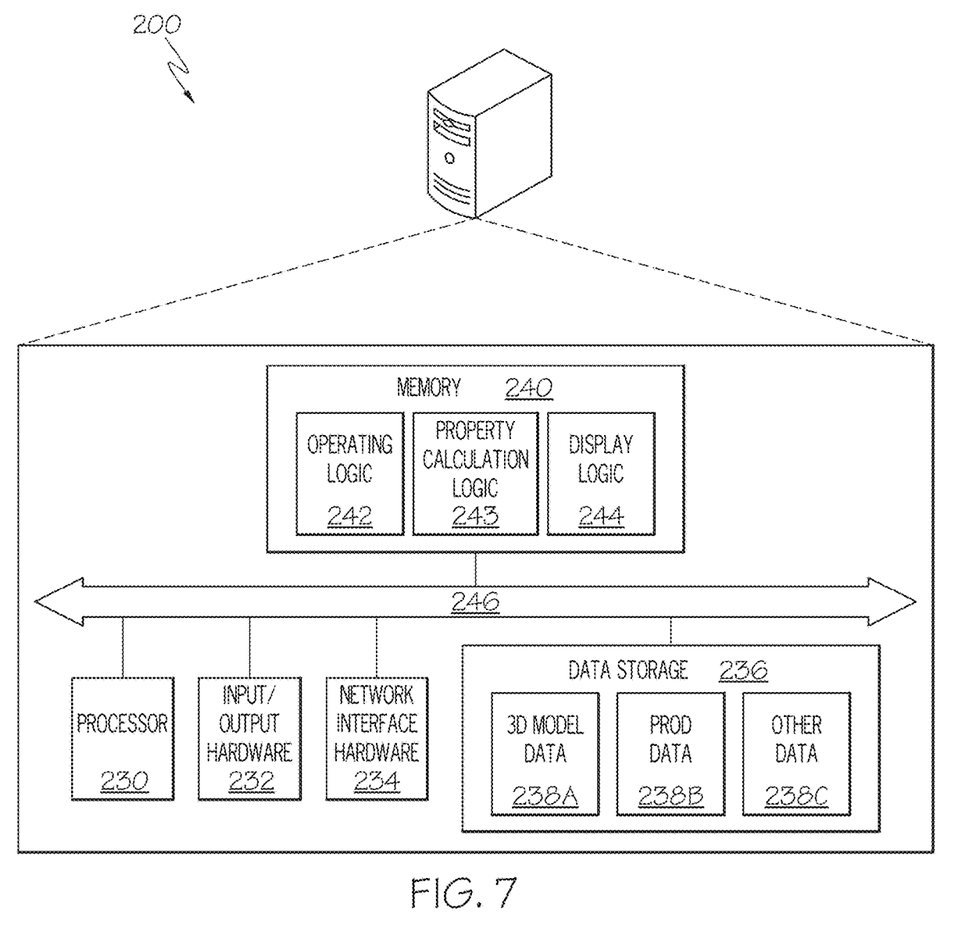
FIG. 7 illustrates an example computing device for performing the functionalities described herein according to one or more embodiments described and illustrated herein.

Embodiments of the present disclosure may be implemented by a computing device, and may be embodied as computer-readable instructions stored on a non-transitory memory device. FIG. 7 depicts an example computing device 200 configured to perform the functionalities described herein. The example computing device 200 provides a system for calculating and displaying information relevant to displaying oil and/or gas field development, and/or a non-transitory computer usable medium having computer readable program code for calculating and displaying information relevant to displaying oil and/or gas field development embodied as hardware, software, and/or firmware, according to embodiments shown and described herein. While in some embodiments, the computing device 200 may be configured as a general purpose computer with the requisite hardware, software, and/or firmware, in some embodiments, the computing device 200 may be configured as a special purpose computer designed specifically for performing the functionality described herein. It should be understood that the software, hardware, and/or firmware components depicted in FIG. 7 may also be provided in other computing devices external to the computing device 200 (e.g., data storage devices, remote server computing devices, and the like).

As also illustrated in FIG. 7, the computing device 200 (or other addition computing devices) may include a processor 230, input/output hardware 232, network interface hardware 234, a data storage component 236 (which may store three-dimensional model data 238A, production data 238B, and any other data 238C), and a non-transitory memory component 240. The memory component 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, property calculating logic 243, and display logic 244 (each of which may be embodied as computer readable program code, firmware, or hardware, as an example). A local interface 246 is also included in FIG. 7 and may be implemented as a bus or other interface to facilitate communication among the components of the computing device 200.

The processor 230 may include any processing component configured to receive and execute computer readable code instructions (such as from the data storage component 236 and/or memory component 240). The input/output hardware 232 may include an electronic display device, keyboard, mouse, printer, camera, microphone, speaker, touchscreen, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices, such as to receive the three-dimensional model data 238A and the production data 238B from various sources, for example.

It should be understood that the data storage component 236 may reside local to and/or remote from the computing device 200, and may be configured to store one or more pieces of data for access by the computing device 200 and/or other components. As illustrated in FIG. 7, the data storage component 236 may include three-dimensional model data 238A, which in at least one embodiment includes three-dimensional attributes regarding one or more fields. The three-dimensional model data 238A may be stored in one or more data storage devices. The three-dimensional model data 238A may be produced by any known or yet-to-be-developed method. Similarly, production data 238B may be stored by the data storage component 236 and may include production attributes relating to the production of wells over a period of time. In another embodiment, the computing device 200 may be coupled to a remote server or other data storage device that stores the relevant data. Other data 238C to perform the functionalities described herein may also be stored in the data storage component 236.

Included in the memory component 240 may be the operating logic 242, the property calculating logic 243, and the display logic 244. The operating logic 242 may include an operating system and/or other software for managing components of the computing device 200. Similarly, the property calculating logic 243 may reside in the memory component 240 and may be configured to facilitate/produce the various property calculations that are displayed. The display logic 244 may be configured to generate the graphical user interfaces herein and to plot the various properties described herein to enable a user to visualize regions of opportunities for field development.

It should now be understood that embodiments of the present disclosure are directed to systems and methods for calculating and displaying field development opportunities. Embodiments cross-link and analyze three-dimensional model properties (such as hydrocarbon volumes) and production data in side-by-side visualizations to allow quick identification of high potential areas of development. Conventional approaches and tools do not provide any means to analyze and correlate these two data sources together. Once a development area is identified, embodiments provide drill-down analysis by calculating hydrocarbon volumes by aerial regions and/or vertical zones and layers. All of these volume calculations are performed interactively and on the fly, in contrast to conventional volume calculations which require pre-defined areas and logics to perform a single volume calculation.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method of displaying field development opportunities, the method comprising:
   receiving, from one or more databases, production data comprising production attributes for a plurality of wells;
   receiving, from the one or more databases, three-dimensional model data comprising model attributes from one or more fields;
   linking the production data and the three-dimensional model data; and
   displaying, in an electronic display, a graphical user interface comprising:
      a two-dimensional view of a selected field of the one or more fields, wherein the two-dimensional view provides a first axis and a second axis;
      a plurality of graphs, each graph of the plurality of graphs comprising a plurality of bins, wherein:
         each graph of the plurality of graphs corresponds to a reservoir property;
         each bin of the plurality of bins corresponds to a range of values along one of the first axis and the second axis; and
         the plurality of graphs are arranged within the graphical user interface such that the plurality of bins are aligned with one another;
   receiving, from the graphical user interface, a selected region; and
   updating the graphical user interface to display:
      a graph of hydrocarbon pore volume plotting hydrocarbon pore volume HCPV (Hydrocarbon Pore Volume) by layer of the selected region; and
      a contact graph of reservoir contacts plotting reservoir well contacts by layer of the selected region, wherein the HCPV graph and the contact graph are arranged adjacent to one another such that layers of the HCPV graph are aligned with the contact graph.

2. The method of claim 1, wherein:
   the production data further comprises well data comprising location coordinates; and
   the cross-linking is performed based on the location coordinates such that the production data and the three-dimensional model data is provided for a plurality of location coordinates.

3. The method of claim 1, wherein the reservoir property comprises two or more of hydrocarbon pore volume, cumulative oil produced, average water cut, average static bottom hole pressure, and existing well locations.

4. The method of claim 1, further comprising:
receiving one or more selected layers from the HCPV graph;
calculating and displaying, in the graphical user interface, a volume for one or more zones of the one or more selected layers.

5. The method of claim 1, wherein the method further comprises displaying, in the graphical user interface, a three-dimensional representation of the selected region.

6. The method of claim 1, wherein the two-dimensional view of the selected field comprises colored portions, and bars of the HCPV graph are colored to match the hydrocarbon pore volume of respective colored portions of the two-dimensional view of the selected field.

7. The method of claim 1, further comprising displaying, in the graphical user interface, locations for existing wells in the selected field.

8. The method of claim 1, further comprising receiving, from the graphical user interface, one or more filters that affects the plurality of graphs.

9. The method of claim 8, wherein the one or more filters comprises a time period.

10. A system for displaying field development opportunities comprising:
one or more processors;
an electronic display;
a non-transitory computer-readable memory storing instructions that, when executed by the one or more processors, causes the one or more processors to:
receive, from one or more databases, production data comprising production attributes for a plurality of wells;
receive, from the one or more databases, three-dimensional model data comprising model attributes from one or more fields;
link the production data and the three-dimensional model data; and
display, in the electronic display, a graphical user interface comprising:
a two-dimensional view of a selected field of the one or more fields, wherein the two-dimensional view provides a first axis and a second axis;
a plurality of graphs, each graph of the plurality of graphs comprising a plurality of bins, wherein:
each graph of the plurality of graphs corresponds to a reservoir property;
each bin of the plurality of bins corresponds to a range of values along one of the first axis and the second axis; and
the plurality of graphs are arranged within the graphical user interface such that the plurality of bins are aligned with one another;
receive, from the graphical user interface, a selected region;
update the graphical user interface to display:
a graph of hydrocarbon pore volume plotting hydrocarbon pore volume HCPV (Hydrocarbon Pore Volume) by layer of the selected region; and
a contact graph of reservoir contacts plotting reservoir well contacts by layer of the selected region, wherein the HCPV graph and the contact graph are arranged adjacent to one another such that layers of the HCPV graph are aligned with the contact graph.

11. The system of claim 10, wherein:
the production data further comprises well data comprising location coordinates; and
the production data and the three-dimensional model data are cross-linked based on the location coordinates such that the production data and the three-dimensional model data is provided for a plurality of location coordinates.

12. The system of claim 10, wherein the reservoir property comprises two or more of hydrocarbon pore volume, cumulative oil produced, average water cut, average static bottom hole pressure, and existing well locations.

13. The system of claim 10, wherein the instructions further cause the one or more processors to:
receive one or more selected layers from the HCPV graph;
calculate and display, in the graphical user interface, a volume for one or more zones of the one or more selected layers.

14. The system of claim 10, wherein the instructions further cause the one or more processors to display, in the graphical user interface, a three-dimensional representation of the selected region.

15. The system of claim 10, wherein the two-dimensional view of the selected field comprises colored zones, and bars of the HCPV graph are colored to match the hydrocarbon pore volume of respective colored zones of the two-dimensional view of the selected field.

16. The system of claim 10, wherein the instructions further cause the one or more processors to display, in the graphical user interface, locations for existing wells in the selected field.

17. The system of claim 10, wherein the instructions further cause the one or more processors to receive, from the graphical user interface, one or more filters that affects the plurality of graphs.

18. The system of claim 17, wherein the one or more filters comprises a time period.

* * * * *